Figure 1:
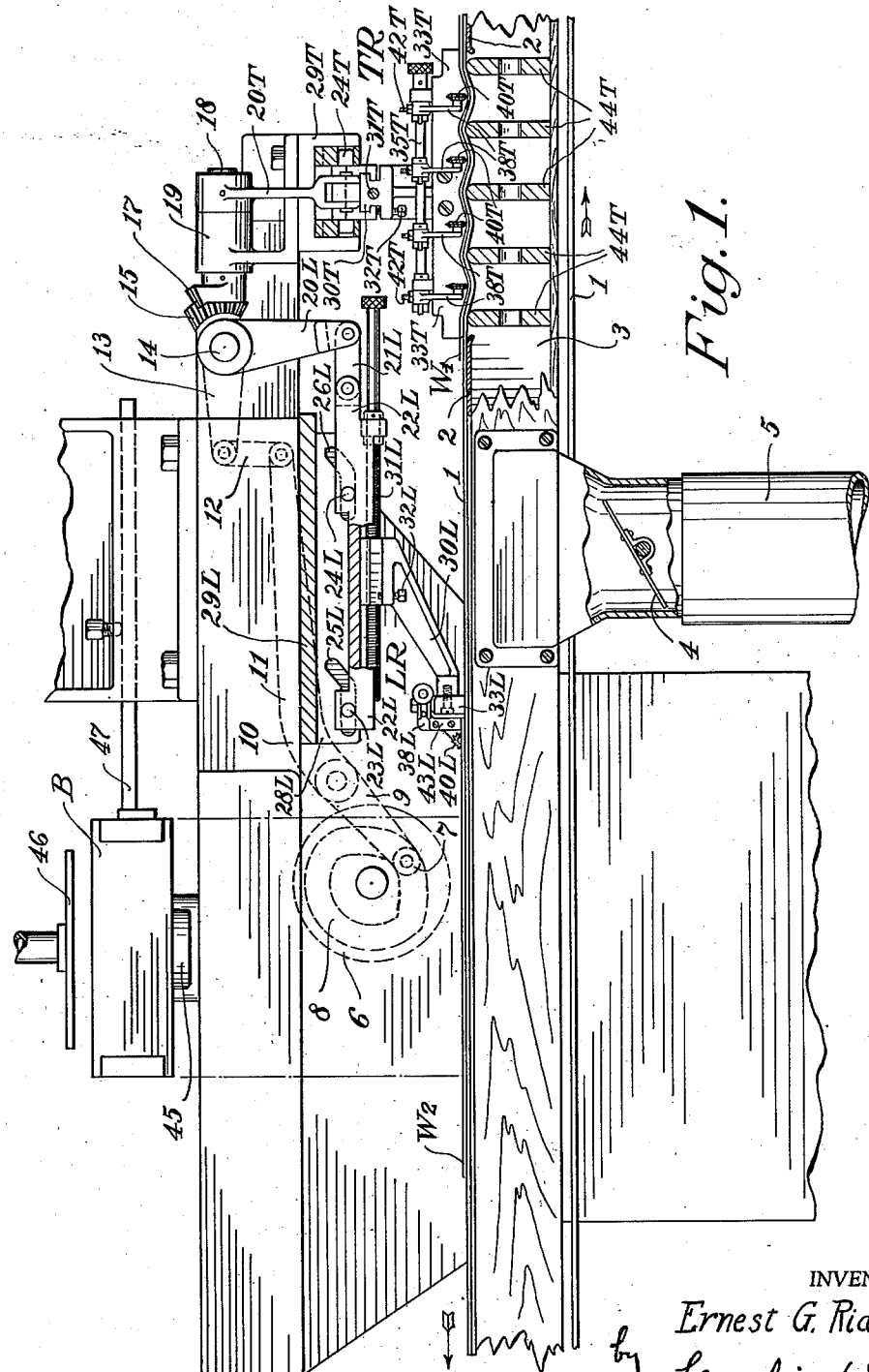

Dec. 14, 1937.                E. G. RIDER                2,102,033
        METHOD OF AND APPARATUS FOR TRANSPORTING AND REGISTERING SHEETS
                    Filed Sept. 11, 1936           3 Sheets-Sheet 1

INVENTOR.
Ernest G. Rider
by Cornelius L. Ehret
ATTORNEY.

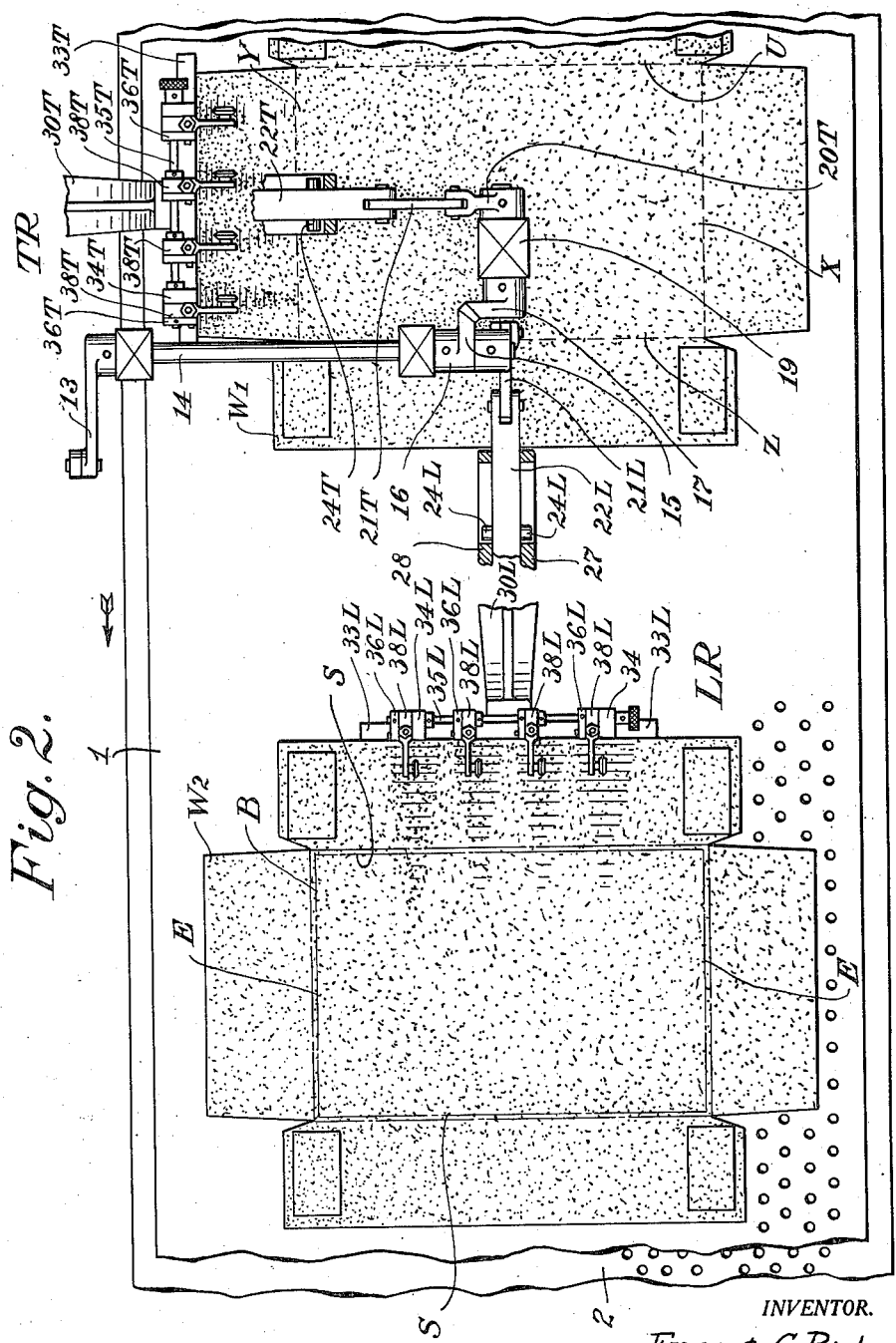

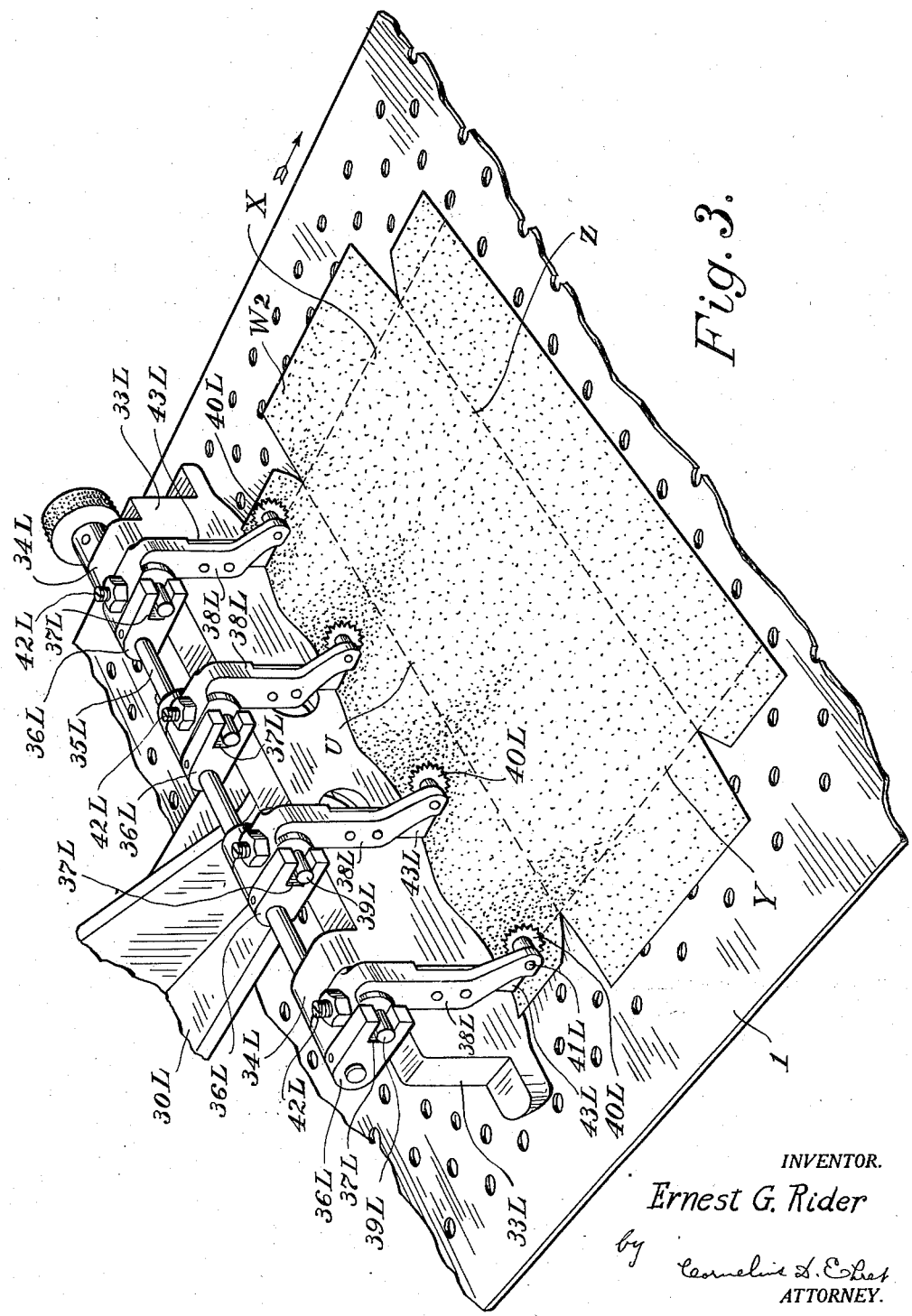

Patented Dec. 14, 1937

2,102,033

UNITED STATES PATENT OFFICE 2,102,033

METHOD OF AND APPARATUS FOR TRANSPORTING AND REGISTERING SHEETS

Ernest G. Rider, Philadelphia, Pa., assignor to Stokes and Smith Company, Philadelphia, Pa., a corporation of Pennsylvania Application September 11, 1936, Serial No. 100,252

33 Claims. (Cl. 271—48)

My invention relates to methods of and apparatus for transporting and registering sheets, particularly box-wrappers, labels, or the like.

In accordance with my invention, a sheet to be moved from one position to another is stiffened, to avoid transverse buckling, by temporarily deforming it, and preferably in a manner to provide one or more corrugations therein extending generally in the direction of the movement.

More specifically, a box wrapper is moved by a transfer device from a position of approximate register to a position of accurate register on a flexible conveyor belt or equivalent, and movement of the sheet as a whole is insured by an arrangement comprising ribbed structure beneath the belt and movable structure above the belt which cooperates with the ribbed structure temporarily to distort both the flexible belt and the wrapper out of their planes.

More particularly, a box wrapper is transported to a position of approximate register at an assembly station by a conveyor belt; while the belt is stationary, the wrapper is pushed by a transfer device to a position of accurate register and before the transfer device is moved in reverse direction a box structure is guided onto the registered wrapper.

My invention further resides in the features of construction, combination and arrangement hereinafter described and claimed.

For an understanding of my invention and for illustration of a preferred form thereof, reference is to be had to the accompanying drawings in which:

Figure 1, partly in section, is a front elevational view of wrapper transporting and registering mechanism;

Fig. 2 is a plan view, partly in section, of parts appearing in Fig. 1;

Fig. 3 in perspective, and on enlarged scale, illustrates in more detail the construction of one of the registering devices.

Referring to Figs. 1 and 2, the belt 1 is an endless conveyor which may receive freshly coated wrappers from a gluing machine for transport to a station at which boxes or box blanks are disposed thereon to form assemblies subsequently received by the form block of a wrapping machine. The belt is preferably porous or suitably perforated and the top plate 2 of the housing 3 is perforated to permit application of suction to hold the wrappers flat during their transport by belt 1. The suction can be regulated by the valve 4 in conduit 5 connected to a suitable suction pump, not shown.

The conveyor 1 is operated intermittently or step-by-step in timed relation to the delivery of wrappers thereto by suitable mechanism not shown. The length of each step and the timing is such that the conveyor comes to rest when a wrapper arrives below the transverse registering mechanism TR and when a wrapper arrives below the longitudinal registering mechanism LR. Preferably as shown in Figs. 1 and 2, the distance between the registering mechanisms is substantially equal to one step of the conveyor movement so that concurrently with arrival of a wrapper, such as W1, below the transverse registering device TR, another wrapper, such as W2, previously registered transversely of the belt, arrives below the longitudinal device LR.

The two registering mechanisms are similar and operate concurrently, one to move a wrapper across the belt to a definite position of transverse alignment and the other to move another wrapper lengthwise of the belt to a definite position of longitudinal alignment.

The cam 6, which controls the operation of the registering mechanisms is timed to make one revolution for each step of the conveyor. The cam follower 7 which engages the cam groove 8 of cam 6 is carried by arm 9 of a lever 10 whose other arm 11 is connected by link 12 to a rock arm 13 suitably secured to shaft 14. The gear segment 15, suitably attached to or integral with hub 16 pinned or otherwise suitably held to shaft 14, engages gear segment 17 suitably secured to shaft 18 supported by bracket 19 extending from the frame of the machine. To shaft 18 on the other side of the bracket is secured the operating arm 20T for the transverse registering mechanism. To shaft 14 is also secured the operating arm 20L for the longitudinal registering mechanism LR.

The construction of both registering devices is the same; for brevity, the following description, applicable to both devices, uses reference numbers to which in the drawings is added the letter T or L, the former identifying the transverse registering device and the latter the longitudinal registering device.

The operating arm 20 is connected by link 21 to the slidable member 22 from which extend the pins 23, 24 received by the slots 25, 26 of plates 27, 28 depending from member 29 suitably attached to the frame of the machine. The slots 25, 26, for purposes hereinafter described, have a portion substantially parallel to the wrapper-transporting surface of conveyor 1 and a portion which is inclined with respect thereto.

To the slidable member 22 is suitably attached the depending bracket 30; to adapt the mechanism for various sizes of wrappers, the bracket 30 is threadably engaged by rod 31 supported by and movable with member 22. By rotation of rod 31, bracket 30 may be adjusted with respect to the slidable member 22; the bracket is clamped in its adjusted position, as by bolt 32.

To the lower end of bracket 30, as most clearly appears in Fig. 3, is affixed the bar 33 whose lower edge is curved for reasons hereinafter more fully explained. From the upper edge of the bar 33, at opposite ends thereof, extend the brackets 34 to provide bearings for the shaft 35 to which is attached a plurality of arms 36 each provided with a slot or notch 37, suitably wider than the diameter of pin 39. Adjacent each of arms 36 is loosely journaled on shaft 35 an inverted L-shaped arm 38 from which extends a pin 39 received by the slot 37 of the adjacent arm 36. Preferably as shown, the lower end of each arm 38 carries a star wheel 40 free to rotate on a pin 41. Each of the arms 38, Fig. 3, is biased, as by gravity, to the limiting position determined by a set-screw 42 threadably received by the arm and extending therethrough in abutting engagement with the upper surface of bar 33. The arms 38 may be thrown out of their operative position by rotating shaft 35 contra to the bias. To the vertical portion of each arm 38 is attached a thin plate 43 whose lower edge is slightly higher than the horizontal plane tangent to the periphery of star wheel 40 at its lowest point.

During movement of the conveyor, the bars 33L and 33T are substantially above the surface of the conveyor and afford no obstruction to the transport of the wrappers because during this time the operating arms 20L and 20T are in such position the slidable members 22L and 22T are in their upper, retracted positions. When the conveyor comes to rest, the slidable members 22 move forwardly and downwardly due to operation of shaft 14 and the inclined surfaces of grooves 25, 26 which receive the pins 23, 24 of the slides.

Below each of the registering mechanisms, the supporting plate 2 for the conveyor belt is cut away (Fig. 1) and in each cut-away section is provided a plurality of ribs 44 which extend in the direction of movement of the particular registering bar; specifically, the ribs 44T at the transverse registering station extend cross-wise of the conveyor belt, and similar ribs at the longitudinal registering station extend lengthwise of the conveyor belt.

When bar 33T descends its curved lower edge depresses the conveyor belt between the ribs 44T; the plates 43T and star wheels 40T of the arms 38T concurrently cause the wrapper to be distorted out of its plane to conform with the waves or ridges formed in the conveyor surface. As movement of arm 20T continues, an edge of the wrapper abuts against the bar 33T and for the remainder of the forward movement of the bar it pushes the wrapper to the desired position predetermined by the adjustment of rod 31T.

When the bar 33T reverses its movement, the wrapper is free by virtue of the reversal, avoiding the need for precise timing which is of paramount importance in transfer or registering devices using grippers. The star wheels 40T merely roll off the edge of the wrapper, the arms 38T swinging slightly away from the bar 33T. Eventually, the pins 23T and 24T arrive at the inclined portions of grooves 25T and 26T whereupon the bar 33T is lifted clear of the conveyor, allowing the conveyor and wrapper to flatten.

The action of registering mechanism LR upon the wrapper at the second registering station is exactly the same except that the wrapper is pushed lengthwise of the conveyor instead of crosswise and accordingly the ridges or waves temporarily formed by bar 33L in the conveyor and wrapper extend longitudinally of the conveyor instead of transversely.

At the conclusion of the operation of mechanism LR, the wrapepr at that station is in a definite, predetermined position and before the conveyor is again in movement, a box or box blank may be guided by a suitable mechanism or structure onto the wrapper with assurance that proper relative positions of the box and wrapper panels exist. Preferably, the box is guided onto the wrapper before the slidable member 22 begins its reverse movement.

In the particular mechanism shown, a stayed box B transported above the final registry station by suction member 45 against the stop 47, is transported and guided into engagement with the registered wrapper by the suction plunger 46. The mechanism for operating arm 45 and plunger 46 is not part of the present invention; it is fully disclosed in Stokes et al. Patent No. 2,018,237.

The invention may also be used in systems, such as shown in Stokes application, Serial No. 16,979, filed April 18, 1935, in which the wrappers are conveyed in front of the wrapping machine operator who, with the assistance of fixed guides, places a box on the wrapper to form an assembly then fed to the wrapping machine.

Referring to Fig. 2, the outline of box B represents the predetermined position to which each box is moved manually, or automatically as by plunger 46. The movement of the wrapper effected by mechanism TR at the first registering station brings the lines X, Y of the wrapper into alignment with the end edges E, E of the bottom panel of the box B, and movement of the wrapper at the second registering station by mechanism LR brings the lines Z, U of the wrapper into alignment with the side edges S, S of the bottom panel of the box. The bowing of the wrapper prior to its registering movement at the stations imparts such additional stiffness thereto there is no tendency for the wrapper to buckle transversely when pushed at its trailing edge. The number of ribs and corresponding depressions in the pusher bar may be varied from the number shown which has in practice proven satisfactory under various operating conditions involving different types of paper, widely different sizes of wrappers, etc. The distance between the two central arms 38 should, of course, be somewhat greater than the length of the panel, engaged by bar 33, of the smallest wrapper to be registered to insure at least one bow or ridge in the wrapper during its registering movement.

The suction applied through the conveyor belt 1 is of magnitude sufficient to prevent curling of the sheet toward the registering stations but is not so great as to hinder movement of the sheet by the registering devices; as previously stated the suction can be regulated as by valve 4.

While a preferred construction and a particular use therefor has been specifically illustrated and described, it is to be understood my invention is not limited thereto but is coextensive in scope with the appended claims.

What I claim is:

1. In a system for transporting sheets, as box wrappers, labels, or the like, the method which comprises pushing the rear edge of a sheet to effect movement of the sheet in a predetermined direction, and stiffening the sheet for movement as a whole by temporarily deforming the sheet to form one or more ridges extending substantially in line with said direction of movement.

2. In a system for transporting sheets, as box wrappers, labels, or the like, the method which comprises pushing the rear edge of a sheet to effect movement of the sheet in a predetermined direction, and bowing the rear portion of the sheet to prevent buckling transversely of its direction of movement.

3. In a system for transporting sheets, as box wrappers, labels or the like, the method which comprises pushing the rear edge of a sheet to effect movement of the sheet in a predetermined direction, and stiffening the sheet for movement as a whole by temporarily deforming at least the rear portion of the sheet to provide corrugations therein extending substantially in line with said direction of movement.

4. In a system for transporting sheets, as box wrappers, labels, or the like, the method which comprises distorting a flexible supporting surface for a sheet out of its plane, complementarily distorting the sheet out of its plane, and moving the distorted sheet along the distorted supporting surface.

5. In a system for transporting sheets, as box wrappers, labels or the like, the method which comprises deforming a flexible supporting surface for a sheet to form corrugations, deforming the sheet at least in part to conform with said corrugations, and pushing the sheet along said surface in a direction substantially in line with said corrugations.

6. In a system for transporting sheets, as box wrappers, labels or the like, the method which comprises transporting a sheet by engagement with a flexible, intermittently movable conveyor surface, deforming said surface while stationary to form corrugations therein and substantially concurrently deforming the sheet at least in part to conform with said corrugations, and pushing the sheet with respect to said conveyor surface in a direction substantially in line with said corrugations.

7. In a system for transporting sheets, as box wrappers, labels or the like, the method which comprises effecting step-by-step movement of a sheet by engagement with an intermittently movable flexible conveyor surface along a path including spaced registering stations, while said surface is stationary, moving the sheet transversely of said conveyor surface at one of said stations to a registered position and longitudinally of said conveyor surface at another of said stations to a registered position, and at each of said stations temporarily deforming the conveyor surface to form corrugations extending in the direction of registering movement of the sheet at that station and temporarily deforming the sheet at least in part to conform with said corrugations.

8. In a system for forming box and sheet assemblies, the method which comprises moving a sheet by engagement with a flexible conveyor surface to a position of approximate register at an assembly station, at said station and while said surface is stationary, moving the sheet with respect to said surface from said position of approximate register to a position of accurate register, stiffening the sheet for movement as a whole from said position of approximate register to said position of accurate register by deforming said surface and said sheet to provide corrugations substantially in line with the direction of movement of the sheet with respect to said surface, and thereafter effecting engagement of a box structure with the registered sheet.

9. In a system for forming box and sheet assemblies, the method which comprises moving a sheet by engagement with a flexible conveyor surface to a position of approximate register at an assembly station and concurrently similarly moving a second sheet to a position of approximate register at a station in advance of said assembly station, while said surface is stationary concurrently moving the sheets in directions at right angles to each other from positions of approximate register to positions of accurate register, stiffening the sheets for their registering movements with respect to said surface by deforming the sheets and the surface to provide corrugations substantially in line with the respective directions of movement of the sheets, and thereafter effecting engagement of a box structure with the registered sheet at the assembly station.

10. In a system for transporting adhesively coated sheets, as box wrappers, labels or the like, the method which comprises effecting movement of a sheet to a registry station by engagement with a flexible conveyor surface at said station and while said surface is stationary, moving the sheet with respect to said surface to a registered position thereon, stiffening the sheet for its registering movement by deforming said surface and at least part of the sheet to provide corrugations extending substantially in line with direction of said registering movement, and applying through said surface to said sheet air pressure of magnitude sufficient to prevent curling of the sheet during transport to said station and insufficient to hinder registering movement of the sheet at said station.

11. In a system comprising a flexible supporting surface for a sheet, such as a box-wrapper, label or the like, means for distorting said surface and a sheet supported thereby out of their planes, and means for moving the distorted sheet along said distorted surface.

12. In a system comprising a flexible supporting surface for a sheet, such as a box-wrapper, label or the like, means for moving the sheet along said surface, and means for insuring movement of the sheet as a whole comprising structure for bowing said surface and the sheet longitudinally of the direction of movement of the sheet.

13. Means for moving a sheet with respect to a flexible supporting surface comprising means for deforming said surface and the sheet to form corrugations therein, and means for pushing the sheet while so corrugated in a direction substantially in line with said corrugations.

14. Means for moving a sheet with respect to a flexible supporting surface comprising ribbed structure below said surface, complementary structure above said surface movable into engagement therewith and cooperating with said ribbed structure to effect corrugations in said surface and said sheet, and mechanism for moving said complementary structure while in engagement with said surface to move said sheet along said surface in a direction in line with said corrugations.

15. Means for moving a sheet with respect to a flexible supporting surface comprising means for deforming said surface and the sheet to provide corrugations therein including ribbed structure below said surface and a plurality of members engaging said sheet in the troughs of said corrugations, and means engaging an edge of the sheet movable to push it along said surface longitudinally of said corrugations.

16. Conveyor means for transporting a sheet to a position of approximate register, structure positioned out of the path of said sheet during its transport by said conveyor means, and means operative while said conveyor means is at rest to move said structure into engagement with an edge of said sheet to push it to a position of accurate register.

17. Conveyor means for transporting a sheet to a position of approximate register, structure positioned out of the path of said sheet during its transport by said conveyor means, means operative while said conveyor means is at rest to move said structure into engagement with an edge of said sheet to push it to a position of accurate register, and means for guiding a box structure into engagement with the registered sheet.

18. A flexible conveyor belt for transporting a sheet, structure having a corrugated surface positioned away from said belt during transport of said sheet, ribbed structure below said belt, and means for moving said first-named structure into engagement with said belt to cooperate with said ribbed structure to form temporary corrugations in the belt and said sheet and to engage an edge of said sheet and push it in the direction of said corrugations.

19. A flexible conveyor belt for transporting a sheet, structure having a corrugated surface positioned away from said belt during transport of said sheet, ribbed structure below said belt, and means operative while said belt is at rest to move said first-named structure into engagement with said belt to cooperate with said ribbed structure in forming temporary corrugations extending transversely of the belt and into engagement with an edge of said sheet for pushing it transversely of said belt.

20. A flexible conveyor belt for transporting a sheet, bar structure having a corrugated surface positioned away from said belt during transport of said sheet, ribbed structure below said belt, and means operative while said belt is at rest to move said bar structure into engagement with said belt to cooperate with said ribbed structure in forming temporary corrugations extending lengthwise of the belt and into engagement with an edge of said sheet for pushing it longitudinally of said belt.

21. Mechanism for moving a sheet along a surface comprising movable structure adapted to engage said surface and abut against an edge of said sheet, and a plurality of pivotally mounted sheet-engaging devices carried by said structure biased to press the sheet against said surface for sheet-advancing movement of said structure.

22. Mechanism for moving a sheet along a flexible surface comprising movable structure having corrugations adapted to engage said surface and an abutment adapted to engage an edge of the sheet, ribbed structure below said flexible surface cooperating with the corrugations of said movable structure to provide for temporary corrugations in said surface, and a plurality of pivoted members carried by said movable structure to press the sheet into the troughs of the corrugations of the flexible surface.

23. A system for forming box and wrapper assemblies comprising a conveyor for transporting a box wrapper to a position of approximate register at an assembly station, reciprocating means operable while said conveyor is stationary to move said wrapper from said position of approximate register to a position of accurate register, and means operable while said reciprocating means and conveyor are at rest and before return movement of said reciprocating means to move a box structure into engagement with the accurately registered wrapper.

24. A system comprising a conveyor intermittently movable to effect step-by-step movement of a plurality of sheets, mechanisms operable while said conveyor is at rest to move two of said sheets with respect to the conveyor, one of said mechanisms comprising structure for pushing a sheet transversely of said conveyor to a predetermined position, and another of said mechanisms comprising structure for pushing a sheet longitudinally of said conveyor to a predetermined position.

25. In a system comprising a flexible supporting surface for a sheet, such as a box-wrapper, label or the like, operating means for effecting step-by-step movement of said surface, and means, operative while said operating means is inoperative, temporarily to distort said surface and a sheet supported thereby out of their planes, and to move the distorted sheet along the distorted surface.

26. In a system comprising a flexible supporting surface for a sheet, such as a box-wrapper, label or the like, operating means for effecting intermittent movement of said surface, and means operative, while said operating means is inoperative, temporarily to corrugate said surface and a sheet thereon and to move the sheet while so corrugated substantially in line with the corrugations.

27. A system comprising a conveyor belt for supporting and transporting a sheet, such as a box-wrapper, label or the like, and sheet-registering means comprising ridged structure movable toward and from said conveyor belt and having means for engaging and distorting the sheet-engaging surface of the belt.

28. A system comprising a conveyor operating intermittently to transport sheets, such as box-wrappers or the like, coated with unset adhesive, registering mechanism operative while said conveyor is at rest to move a sheet bodily with respect thereto, means for applying suction to the sheet, and means operable to vary the applied suction to a magnitude suitable to prevent curling of the sheet and insufficient to hinder movement of the wrapper by said registering mechanism.

29. In a system for registering sheets, as box-wrappers, labels or the like, coated with unset adhesive, the method which comprises temporarily distorting a flexible supporting surface for a sheet out of its plane, complementarily distorting the sheet, moving the distorted sheet along the distorted supporting surface, and during the movement of the sheet applying suction thereto of magnitude sufficient to prevent curling of the sheet and insufficient to hinder said movement thereof relative to said surface.

30. In a system for transporting sheets, as box-wrappers, labels or the like, the method which comprises transporting a sheet to a position of approximate register by engagement with an intermittently movable conveyor surface, while said surface is stationary distorting the sheet to form therein one or more corrugations, and moving the distorted sheet with respect to the stationary conveyor surface and in direction substantially in line with the corrugations, to the position of accurate register.

31. A system comprising an intermittently operating conveyor for delivering sheets, as box wrappers, labels or the like, in succession to a position of approximate register, means operating independently of said conveyor for distorting an approximately registered sheet while the conveyor is at rest, and means for moving the sheet, while distorted and while said conveyor is at rest, to the position of accurate register.

32. A system comprising a conveyor belt for transporting a sheet, as a box-wrapper or the like, away from adhesive-applying mechanism, means for effecting intermittent movement of said conveyor belt, registering means for distorting a sheet on said conveyor belt and for moving it while distorted and while said conveyor is at rest to a position of register, means for applying suction to the sheet through said conveyor belt, and means operable to vary the applied suction to a magnitude suitable to prevent curling of the sheet and insufficient to affect operation thereon of said registering means.

33. A system comprising means for conveying a sheet, as a box-wrapper or the like, and means for registering the sheet by movement with respect to, and independently of movement of, said conveying means comprising a plurality of spaced members acting upon the sheet at or near an edge thereof to form in said sheet one or more corrugations which extend beyond and are unsupported by said members.

ERNEST G. RIDER.